Aug. 19, 1969 S. J. SCHWARTZ 3,462,750

BACK-E.M.F. SENSING MEMORY SYSTEM

Filed Nov. 14, 1966 2 Sheets-Sheet 1

INVENTOR
SIDNEY J. SCHWARTZ

BY Louis A Kline
Glenn W. Bowen

HIS ATTORNEYS

INVENTOR
SIDNEY J. SCHWARTZ
BY Louis A. Kline
Glenn W. Bowen
HIS ATTORNEYS

United States Patent Office 3,462,750
Patented Aug. 19, 1969

3,462,750
BACK-E.M.F. SENSING MEMORY SYSTEM
Sidney J. Schwartz, Beavercreek Township, Ohio, assignor to The National Cash Register Company, Dayton, Ohio, a corporation of Maryland
Filed Nov. 14, 1966, Ser. No. 593,861
Int. Cl. G11c 7/00, 7/02
U.S. Cl. 340—174 10 Claims

ABSTRACT OF THE DISCLOSURE

A magnetic memory which includes an array of magnetic memory elements is disclosed. A plurality of row conductors are connected via the collector-emitter path of a plurality of transistors to a common junction point to which is coupled a threshold sensing detector, a differential amplifier detector, or any other appropriate type of detector. Upon application of coincident read current to a row and to a column drive conductor, the elements coupled to that pair of conductors switch, inducing a back-EMF into the associated pair of conductors, the induced back-EMF being sensed by the sensing means that is coupled to the common junction point.

This invention relates in general to the readout of magnetic memory elements and in particular to the readout of magnetic memory elements by back-EMF sensing.

Magnetic memory matrices are usually constructed in the form of a two-dimensional array of memory elements arranged into rows and columns. Each row and column of the matrix is associated with a particular conductive drive line which magnetically couples the memory elements located along the row or the column. The memory elements of the matrix are constructed of magnetic material which has a substantially rectangular magnetic hysteresis characteristic. One saturation state of the memory element is arbitrarily selected to represent a "1" or a true condition, and the opposite saturation state of the memory element then represents the "0" or a false condition. In the coincident current memory organization of the preferred embodiment of the present invention, a particular memory core can be switched to the "1" state from the "0" state by the concurrent application of write selection currents of the proper amplitude and polarity to the row conductor and the column conductor which intersect at the location of the selected memory element. The write selection currents applied to the row conductor and the column conductor are of such a magnitude that a memory element which is affected only by a row conductor or a column conductor will not receive sufficient magnetic drive to switch to the "1" state from the "0" state. The application of concurrent read selection currents to the row and column conductors of a selected memory element which was previously set into a "1" state will result in a change of the magnetization state of the selected memory element from the "1" state to the "0" state. The read selection currents in the preferred embodiment have a polarity which is opposite to the polarity of the write selection currents. If the memory is operating in a destructive readout mode, the magnetization state of a memory element will completely reverse from the "1" state to the "0" state upon the application of the concurrent read selection currents. If the memory is operating in a non-destructive readout mode, the effect is a temporary displacement of the magnetization of the memory element from the "1" or the "0" state in such a manner that a detectable output signal is produced whose characteristics differentiate between a "1" and a "0."

When a memory element reverses or changes its magnetization state from a "1" state to a "0" state in response to the applied read selection currents, it induces a back-EMF signal, that has a polarity opposite to the polarity of the applied read selection voltage, into the row and column conductors associated with the selected memory element. The present invention uses a back-EMF sensor to sense the back-EMF which occurs when a memory element changes from a "1" state to a "0" state or produces a non-destructive "1" or "0" readout signal. A single back-EMF sensor may be employed to sense all of the memory elements in a memory plane or in a memory core subgroup. The read selection current that is applied to the row conductors of the present invention is supplied through a number of selectable transistors which have their collectors tied in common to a resistor which is supplied by a direct current voltage source. A back-EMF sensor is connected to the common junction point which joins the collectors of the selection transistors. The back-EMF sensor of the present invention is, therefore, able to sense the state of a selected memory element in a memory array at one end of a load impedance that is directly coupled to the read voltage source.

It may be desirable, for some applications of the present invention, to integrate the back-EMF signal, although adequate signal strength has been achieved in the preferred embodiment of this invention without the use of back-EMF signal integration.

The memory system of the present invention does not require a coupling diode for every drive line to couple the back-EMF signal to the back-EMF sensor. In large memory arrays, the simplification of circuitry and the reduction of complexity in memory design resulting from the present invention prove to be substantial. Furthermore, the present invention is useful in both the destructive and the non-destructive readout mode of operation, providing that the magnetic element is sufficiently displaced from the "1" state in the non-destructive mode to generate a substantial back-EMF signal. The use of only one sense amplifier for a plurality of memory elements reduces the manufacturing cost of the memory system considerably. More than one sensor may be utilized if parallel readout is desired, however.

It is therefore the object of the present invention to provide a magnetic memory sensing system employing back-EMF sensing in a manner which allows a plurality of memory elements to be sensed by one sense amplifier.

Other objects of this invention will become apparent to those skilled in the art by reference to the appended drawings, specification, and claims.

Figure 1:
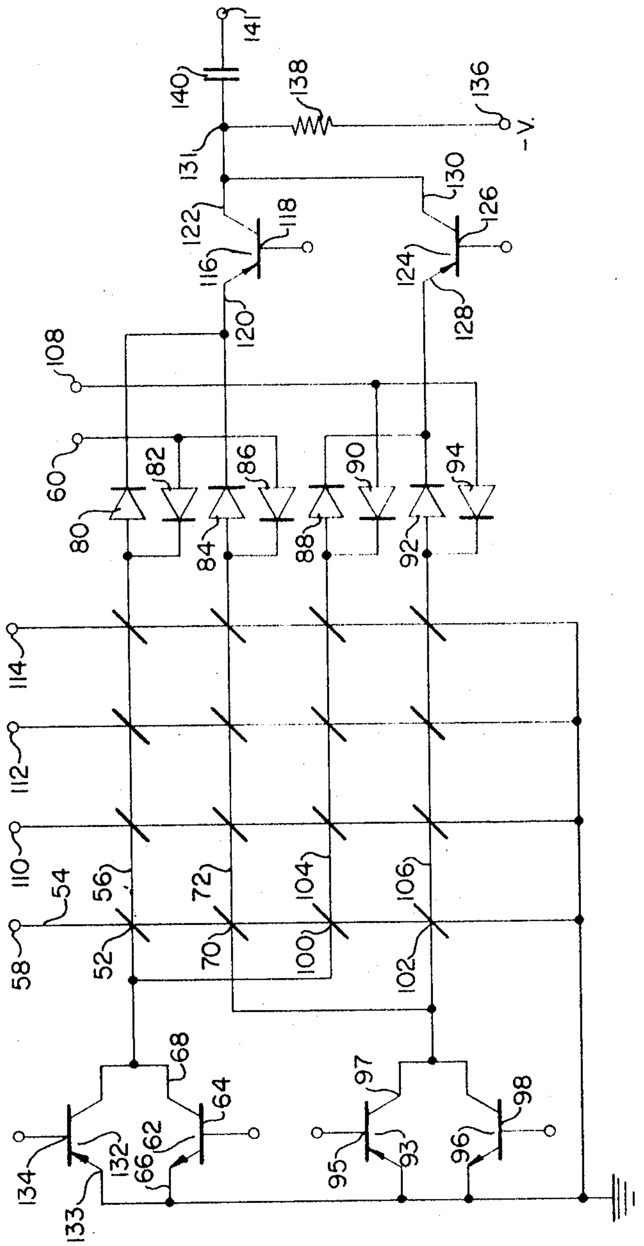
FIG. 1 is a schematic of a memory matrix and drive networks.
Figures 2, 2A:
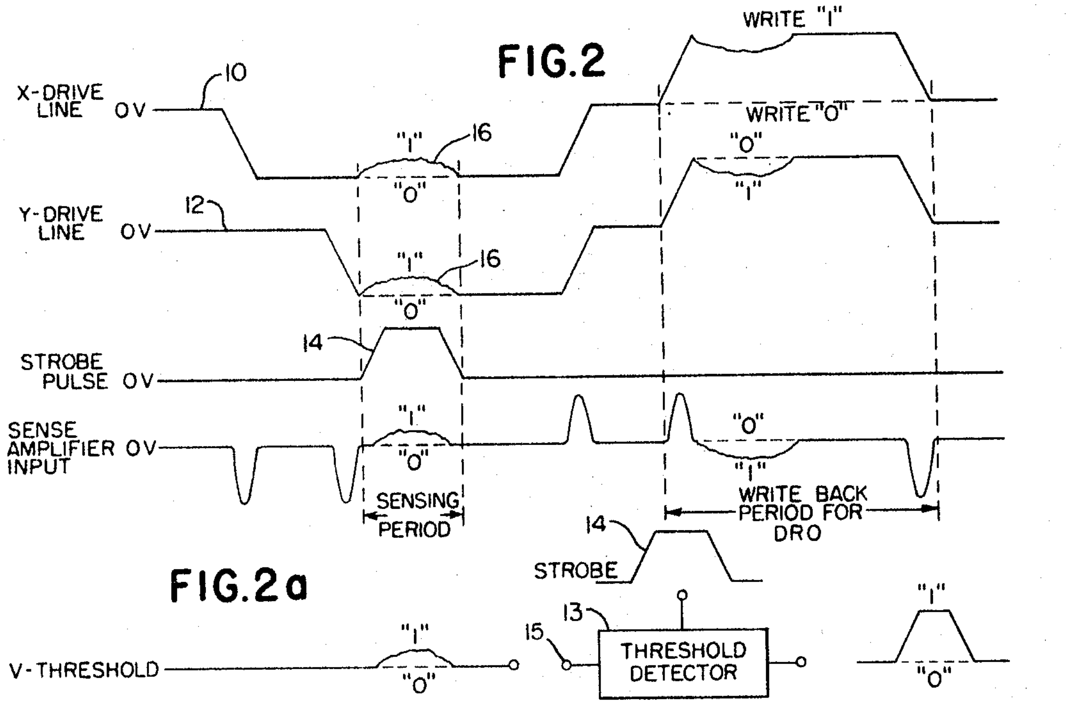
FIG. 2 is a timing chart for one manner of operation of the present invention.
Figures 3, 3A:
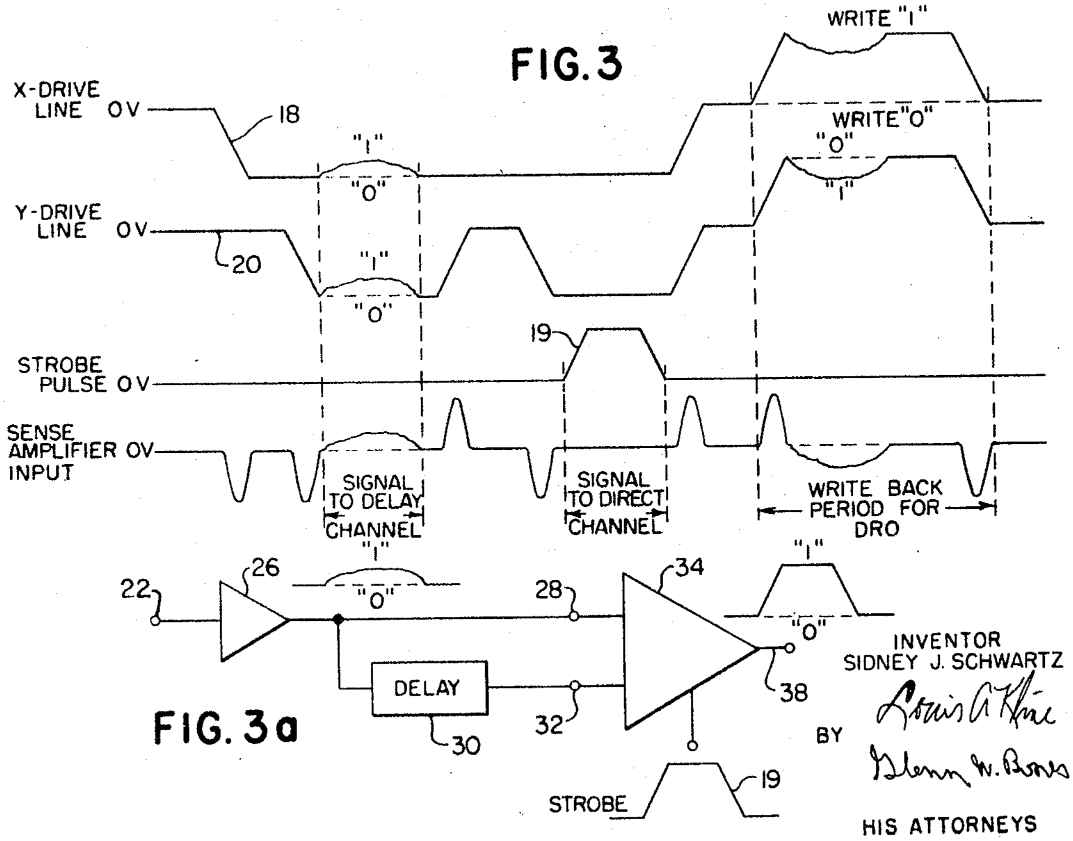

FIG. 2*a* is a block diagram of the sensing circuit employed in conjunction with the timing scheme of FIG. 1;

FIG. 3 is a timing chart for another manner of operation of the circuit shown in FIG. 1; and FIG. 3*a* is a block diagram of the sensing circuit employed in conjunction with the timing scheme of FIG. 3.

FIG. 1 shows the schematic diagram of the memory matrix and the selection circuits of one embodiment of the present invention. The memory element 52, which in the embodiment of FIG. 1 is a magnetic core, is threaded by the column drive line 54 and the row drive line 56. The memory element 70, when also is a magnetic core, is threaded by the column drive line 54 and the row drive line 72. It is of course apparent that magnetic memory elements other than cores—for example, thin magnetic films—may be employed in the present invention. The transistor 62 is connected to the row drive line 56. When a negative potential is applied to the base 64 of the NPN transistor 62 and a positive potential is applied to the base 134 of the PNP transistor 132 by an external control circuit (not shown), the transistor 62 and the transistor 132 will both be cut off, and a positive polarity pulse on the terminal 60 will not produce current flow through the row drive line 56. When positive potentials are applied to the base 64 of the transistor 62 and the base 134 of the transistor 132 by the external control circuit, the transistor 62 will be in saturation, and the collector 68 will be substantially at the ground potential level of the emitter 66 whenever a positive polarity pulse is also applied to the terminal 60, and the transistor 132 will be cut-off. When the transistor 62 is in saturation and the positive polarity write pulse is present on the terminal 60, current will flow from the terminal 60, through the diode 82, which has its anode connected to the terminal 60, through the row drive line and through the transistor 62 to ground. The current flow through the row drive line 56 establishes a magnetic field which is coupled to the memory element 52 and to the other memory elements that are located along the row drive line 56.

If the row drive line 56 is conducting current from the terminal 60 through the transistor 62 to ground, a concurrent positive polarity pulse on the terminal 58 will result in a current flow through the column drive line 54. The current flow through the column drive line 54 creates a magnetic field which is coupled to the memory element 52 concurrently with the magnetic field which is created by the current flow through the row drive line 56. The magnetic field produced by the column drive line 54 is also coupled to the other memory elements which are coupled to the column drive line 54, but the memory element 52 is the only element in the memory matrix which has applied magnetic fields from both the column drive line 54 and the row drive line 56. The concurrently applied magnetic write fields result in storing a "1" in the memory element 52. If either field were absent, a "1" would not be stored in the memory element 52, and the memory element 52 would remain in the "0" state, which is the initial state of a memory element following a previous destructive readout cycle.

When the memory element 70 is selected to store a "1," the NPN transistor 96 is driven into saturation by a positive control signal on the base 98, a positive polarity pulse is applied to the terminal 60, and a positive potential control signal is applied to the base 95 of the PNP transistor 93 to bias the transistor 93 to cut-off. The current path to ground from the terminal 60 is completed through the diode 86, which has its anode connected to the terminal 60, and through the row drive line 72. Coincident positive polarity pulses applied to the terminals 58 and 60 result in storing a "1" in the memory element 70, in the manner previously described for the memory element 52, when the transistor 96 is in saturation and concurrent positive polarity signals are applied to the terminals 58 and 60. The memory elements 100 and 102 are set into a "1" state in a manner similar to that previously described for the memory elements 52 and 70. The transistor 62 is connected to the row drive line 104, which is in turn coupled to the terminal 108. The application of a positive polarity pulse to the terminals 60 and 108 is controlled by external control circuits (not shown) which are designed to supply a positive polarity pulse to the terminals 60 or 108 during a given write cycle. The transistor 62, therefore, can be used as a selectable row drive line grounding switch for both of the memory elements 52 and 100, and, therefore, the transistor 62 forms a partial selection switch which in conjunction with the state of either terminal 60 or terminal 108 determines the particular row drive line which is energized.

The transistor 96 is similarly employed to ground both the row drive line 72, associated with the memory element 70, and the row drive line 106, associated with the memory element 102. The row drive line 106, which is associated with the memory element 102, is coupled to the terminal 108. Selection of a memory element to store a "1" in the second column is controlled in the same manner as the selection of a memory element to store a "1" in the first column except that now the column drive line 110 has the applied concurrent positive polarity pulse instead of the column drive line 54. The column drive line 112 controls the partial selection of a memory element in column three, and the column drive line 114 controls the partial selection of a memory element in column four.

The row drive line 56 is grounded through the PNP transistor 132 during the read cycle when the base 134 of the transistor 132 is supplied a negative potential and the base 64 of the transistor 62 is supplied with a negative potential by the external control circuitry. The concurrent application of potentials which are more negative than the potential of the respective emitters 120 and 133 to the base 134 of the transistor 132 and the base 118 of the transistor 116 results in the establishment of a magnetic field at the memory element 52 by the row drive line 56, since both the transistors 116 and 132 will be in saturation, and the D.C. negative potential supply 136, which is coupled to the collector 122 of the transistor 116 through a resistor 138, will supply the necessary current.

Since both the row drive line 56 and the column drive line 54 produce concurrent magnetic fields at the memory element 52 during the read cycle which are opposite in direction to the concurrent magnetic fields produced at the memory element 52 during the write cycle, the memory element 52 will reverse its state from a "1" to a "0" state during the read cycle, if a "1" was previously stored in the memory element 52 during the write cycle.

The diode pairs 80 and 82, 84 and 86, 88 and 90, and 92 and 94 are employed to establish a ground potential level on the emitter 120 of the transistor 116 and the emitter 128 of the transistor 124 when the potentials on the terminals 60 and 108, respectively, are at a ground potential level, thereby establishing a reference level for the control signals applied to the bases 118 and 126, respectively.

During the write-in or store portion of the memory cycle, the PNP transistors 116 and 124 are in a cut-off state due to the application of positive potential level control signals on their respective bases 118 and 126 by external control circuitry (not shown), and the junction point 131, which is connected to the respective collectors 122 and 130, is isolated from their respective emitters 120 and 128 and is, therefore, at a potential equal to the potential of the negative polarity supply 136.

To accomplish a destructive readout of a selected memory element—for example, the memory element 52—which has a stored "1," it is necessary to reverse the polaritly of the concurrently applied selection pulse on the column drive line. Therefore, a negative polarity pulse is applied to the terminal 58 during the read cycle to establish a current flow through the column drive line 54 which is opposite in polarity to the current flow through the column drive line 54 during the write or store cycle.

The reversal of the magnetization state of a memory element from a "1" state to a "0" state results in a back-EMF signal which is induced into the associated row drive line—for example, the drive line 56—following the application of the concurrent magnetic read fields to the selected memory element—for example, the memory element 52. Since the back-EMF resulting from the reversal of state of the selected memory element from a "1" state to a "0" state is of a potential polarity opposite to the potential polarity established by the negative voltage supply 136, it is of a positive polarity in the described embodiment of the invention and it therefore opposes the applied negative potential on the drive line 56.

The positive-going potential signal established by the back-EMF of the selected memory element causes the emitter 120 of the transistor 116 to become more positive in polarity, and this produces a positive-going potential on the collector 122 of the transistor 116. A positive-going potential on the collector 122, such as those shown in FIGS. 2 and 3, is passed to the common junction point 131, where it is coupled through the transistor 116 and to a sensing circuit connected to the terminal 141 through the capacitor 140. The capacitor 140 is effective to pass only time-varying signals to the detecting circuit and serves to block steady-state signals from the detecting circuit. Since the back-EMF generated by the selected memory element appears on both the column and the row drive lines, it is apparent that a sensing device could also be coupled to a common junction point of the column drive lines instead of the junction point 131.

The treading of a sense line through each of a large number of memory cores is not required by the memory system described above. Sense line attenuation, resulting from excessive sense line length, is normally a problem in a memory sensing system employing long sense lines. This problem is to a large extent eliminated by the above-described memory sensing system. The performance of the preferred embodiment of the described invention may be enhanced by reducing the saturation resistance of the transistors and the shunt capacitance of the transistors and the diodes which are employed as much as possible.

While the described embodiment of the present invention has been described as a coincident current write and coincident current destructive readout memory system, the described manner of writing into the memory is not intended to limit the scope of this invention. A number of selective inhibiting systems may also be used with the present invention by obvious modification of the described invention by those skilled in the art. Although a coincident current memory system has been described, it is apparent that word organized memory and other types of memory organization may be similarly employed with the present invention. The principles of this invention are equally applicable to both non-destructive and other types of destructive readout memory systems wherein a substantial back-EMF is generated by a selected magnetic memory element.

FIG. 2 shows a timing chart for one manner of operation of the circuit shown in FIG. 1 when the sensing circuit shown in FIG. 2*a* is employed. The row drive of X voltage 10 is applied prior to application of the column or Y voltage 12 to allow the sensing circuit time to stabilize after the X drive voltage is applied. The sensing circuit coupled to the row drive line can be merely a threshold detecting circuit which is strobed or actuated at the correct time by a strobe pulse 14, in the manner known to those skilled in the art. The back-EMF 16 of a selected memory bit occurs after the column or Y drive voltage is applied during the sensing period, and coincidence of a strobe pulse during this period allows the sense amplifier to sense the voltage change occurring at the common junction point 131 at this time. The threshold detecting sense amplifier circuit 13 of FIG. 2*a* is coupled to the junction point 131 through the capacitor 140, and therefore only voltage changes induced into a drive line will be sensed by the detecting circuit. If the selected memory element was originally set in a "0" state, a back-EMF is not induced into the associated drive lines, since the state of the selected memory element is not reversed by the read drive voltage, as it is when the selected memory element is initially set into a "1" state. FIG. 2*a* is a block diagram of the threshold detector employing the timing scheme of FIG. 2.

FIG. 3 is a timing chart for a second manner of operation of the circuit shown in FIG. 1 when the sensing circuit shown in FIG. 2*a* is employed. In this embodiment, an X drive voltage 18 is applied prior to application of Y drive voltage 20, allowing the sensing circuits time to stabilize after the X drive voltage is applied. The terminal 22 is connected to the terminal 141, and voltage changes occurring at the junction point 131 are coupled through the capacitor 140 and the preamplifier 26 to the direct input terminal 28 of the sensing network 34 and to the delay circuit 30. The employment of capacitive coupling and a preamplifier is not essential to the present invention, and other types of signal coupling known in the art may be employed. The delay circuit 30 is connected to the delayed input terminal 32 of the back-EMF sensing network 34. Application of the first Y drive pulse 20 shown in FIG. 2 results in switching the magnetic core if a "1" is stored in the memory core, and a back-EMF will therefore be induced into the associated row drive line and will be coupled through the preamplifier 26 into the direct input terminal 28. This pulse causes no output at the output terminal 38 of the sensing network, since the sensing network 34 is actuated only when a strobe voltage pulse 19 is present. The delay circuit 30 meanwhile delays this same signal for a predetermined period, and, at the end of this predetermined period, this delayed signal is applied to the delayed input terminal 32.

The second Y drive pulse is timed to provide a second signal output, which is coupled through the preamplifier 26, so as to arrive at the direct input terminal 28 coincidentally with the arrival of the delayed signal at the delayed input terminal 32 of the sensing network 34. The sensing network 34 is a differential amplifier which produces an output signal proportional to the difference between the signal at the direct input terminal 28 and the delayed signal at the delayed input terminal 32. Since all conditions are equivalent for both pulses of the Y drive voltage, except that the first pulse will produce a back-EMF signal, when the associated memory element switches from a "1" state to a "0" state, the amplified difference signal will therefore consist essentially only of the desired back-EMF signal.

It is apparent that the delay circuit 30 of the described embodiment may be eliminated if a dummy drive line is driven by the row read voltage and the resulting signal is fed directly to the terminal 32 concurrently with a voltage signal appearing at the terminal 28 due to the first Y drive voltage pulse on the row drive line. The strobe voltage will now appear coincidentally with the first Y drive voltage pulse, and the second Y drive voltage pulse is not necessary in this instance.

It is also apparent that each of the terminals 28 and 32 may be connected to different cores, only one of which is driven at any given time in such a manner that it can generate a back-EMF signal that indicates the storage state of the core. In this embodiment, the unused core always supplies a signal to the associated terminal that has a noise component that is substantially identical to the noise component of the signal that is supplied to the other terminal of the amplifier. The output of the differential amplifier then consists essentially of only the desired back-EMF signal when a selected memory core produces such a signal.

After the state of the selected memory element is determined, it is necessary to invert the polarity of both the X and Y drive voltage pulses to restore a "1" state in the selected memory bit when destructive readout operation is employed if it is desired to retain the contents of the memory.

What is claimed is:

1. A magnetic memory system comprising:

(a) a plurality of magnetic memory elements, each having an initial magnetization state, and (b) means to selectively apply a magnetic read field to a selected memory element of said plurality of memory elements to cause a read displacement of the initial magnetization state of the selected memory element, said means comprising:

(1) a plurality of electrical conductors, each of the plurality of magnetic elements being magnetically coupled to one of the electrical conductors of the plurality of electrical conductors, and (2) a plurality of coupling means, each having a terminal coupled to one of the electrical conductors and a common terminal coupled to a potential source of predetermined polarity, the coupling means being constructed to selectively supply an electrical current that is derived from the potential source to its associated electrical conductor whenever a particular magnetic element which is coupled to the associated electrical conductor is a selected memory element which is to have a magnetic read field applied thereto; and (c) sensing means coupled to the common terminal of the coupling means to sense the back-EMF associated with the selected memory element that occurs whenever the selected memory element experiences a predetermined magnetization state displacement, the back-EMF being induced into the selected electrical conductor and being coupled through the selected coupling means to the common terminal.

2. A device as in claim 1 wherein the sensing means has an input terminal and is constructed to produce an output signal whenever the signal on the input terminal of the sensing means crosses a threshold level and the sensing means is activated by a strobe signal.

3. A device as in claim 1 wherein (a) the sensing means includes a differential amplifier that has a first input terminal and a second input terminal and produces an output signal that is proportional to the difference between the input signals appearing on the first and the second input terminals, and (b) means are provided to create a noise cancellation input signal at the second input terminal when the first input terminal receives an input signal resulting from the initial magnetic read field.

4. A device as in claim 3 wherein (a) the means to provide the noise cancellation input signal to the second input terminal includes a signal delay means that has its output coupled to the second input terminal, and (b) means are provided to supply the input of the delay means with a noise cancellation input signal that is identical to the non-information-bearing portion of the information-bearing input signal that is applied to the first input terminal, said noise cancellation input signal being applied to the input of the delay means prior to the time that the information-bearing input signal is applied to the first input terminal by a time interval that is equal to the delay time of said delay means.

5. A device as in claim 4 wherein the sensing means is activated by a strobe signal to eliminate interfering noise signals.

6. A memory system comprising:

(a) a plurality of magnetic memory elements, each having a first and a second magnetic state; and (b) a plurality of first electrical conductors; and (c) a plurality of second electrical conductors, each of the memory elements of said plurality of memory elements being magnetically coupled to one conductor from the plurality of first conductors and to one conductor from the plurality of second conductors; and (d) means to initially condition various ones of said plurality of memory elements selectively into their second magnetic states; and (e) means to supply a first electrical current selectively to a particular conductor in the first plurality of conductors; and (f) means to supply a second electrical current selectively to a particular conductor in the second plurality of conductors while the first electrical current is being supplied to the selected conductor in the first plurality of conductors, coincident magnetic fields thereby being created at an associated memory element located at the intersection of said conductors to cause the magnetization state of the associated memory element to change from its second magnetic state to its first magnetic state if the memory element was initially conditioned into its second magnetic state, said means to supply the second electrical current including a potential source having an output terminal and selectable switching means connected between the output terminal and each individual conductor of the plurality of second conductors; and (g) sensing means coupled to the output terminal, said sensing means being constructed to sense the back-EMF associated with the change of magnetization state of the selected memory element from its second magnetic state to its first magnetic state, the back-EMF being induced into the associated conductor of the second plurality of conductors and being coupled through the selected switching means to the output terminal.

7. A device as in claim 6 wherein the sensing means has an input terminal and is constructed to produce an output signal whenever the signal on the input terminal of the sensing means crosses a threshold level and the sensing means is activated by a strobe signal.

8. A device as in claim 6 wherein (a) the sensing means includes a differential amplifier that has a first input terminal and a second input terminal and produces an output signal that is proportional to the difference between the input signals appearing on the first and the second input terminals, and (b) means are provided to create a noise cancellation input signal at the second input terminal when the first input terminal receives an input signal resulting from the initial magnetic read field.

9. A device as in claim 8 wherein (a) the means to provide the noise cancellation input signal to the second input terminal includes a signal delay means that has its output coupled to the second input terminal, and (b) means are provided to supply the input of the delay means with a noise cancellation input signal that is identical to the non-information-bearing portion of the information-bearing input signal that is applied to the first input terminal, said noise cancellation input signal being applied to the input of the delay means prior to the time that the information-bearing input signal is applied to the first input terminal by a time interval that is equal to the delay time of said delay means.

10. A device as in claim 9 wherein the sensing means is activated by a strobe signal to eliminate interfering noise signals.

References Cited

UNITED STATES PATENTS

| | | | |
|---|---|---|---|
| 3,125,743 | 3/1964 | Pohm et al. | 340—174 |
| 3,222,669 | 12/1965 | Lee | 340—347 |

BERNARD KONICK, Primary Examiner

KENNETH KROSIN, Assistant Examiner